3,022,336
PROCESS FOR DEHYDRATING ALPHA-HYDROXY-ISOBUTYRIC ACID ESTERS

Kurt Sennewald, Knapsack, near Koln, Günter Dobek, Koln-Zollstock, and Herbert Joest, Koln-Sulz, Germany, assignors to Knapsack-Griesheim Aktiengesellschaft, Knapsack, near Koln, Germany, a corporation of Germany
No Drawing. Filed Sept. 9, 1958, Ser. No. 759,862
Claims priority, application Germany Sept. 17, 1957
10 Claims. (Cl. 260—486)

This invention relates to a process for the dehydration of α-hydroxy-isobutyric acid esters of the general formula

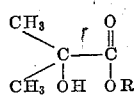

to give the corresponding esters of methacrylic acid.

Numerous processes have already been proposed to split off water from organic hydroxy acids and the derivatives thereof. In any case, and particularly when dehydrating α-hydroxy-acid esters, such as an α-hydroxy-isobutyric acid ester, the splitting off of the α-hydroxy group is extremely difficult since under the prevailing cleavage conditions the molecule is very unstable and prone to an uncontrollable decomposition. When the α-hydroxy-isobutyric acid ester is subjected, for example, to pyrolysis, there are formed even at about 470–480° C., as undesired reaction products, considerable amounts of acetone, acetaldehyde, alcohol and carbon monoxide, in addition to the desired corresponding methacrylic acid esters. About 60–65% of the ester used travels through the furnace in which the pyrolysis takes place without being reacted.

Furthermore, there are known numerous other processes in which the molecule is first stabilized by replacing the hydroxy group, for example by halogen or by esterification, and the cleavage reaction subsequently brought about to obtain the methacrylic acid ester.

It has also been proposed to split off the water by means of phosphorus pentoxide. However, all these known processes are very expensive and, therefore, uneconomical when carried out on an industrial scale.

When using inorganic acids such as phosphoric acid as dehydrating substance, it is necessary to perform the aforesaid pyrolysis at a temperature above a definite limit of, for example, about +500° C. in order to avoid a wetting of the walls with condensed phosphoric acid involving an undesired decomposition of the organic products. It was, therefore, necessary to develop a novel mode of operation which is not only carried out in the gaseous phase but in the liquid phase of the dehydrating substance for substances which can be easily decomposed as such at high temperatures.

The process of the present invention involves a considerable technical and economical advance since it can be carried out at lower temperatures and in the liquid instead of the gaseous phase. Consequently, it requires considerably smaller amounts of energy and, at the same time, much less expensive apparatus with smaller expense for the production unit.

According to the present invention, there is provided a process for the dehydration of alpha-hydroxy-isobutyric acid ester, wherein said esters are introduced in a first stage in the liquid or vaporous state into a weakly acid liquid heating bath containing phosphoric acid and/or phosphates which is maintained at a temperature above the boiling point of the ester used in a manner such that the reaction products formed distill off from the heating bath directly and at once and are then condensed in a second stage and finally worked up in known manner by distillation.

The unreacted ester obtained in the second stage can be recycled into the first stage of the process. Thus a very good yield of methacrylic acid ester is obtained calculated on the total amount of α-hydroxy-isobutyric acid ester used. When working according to the process of the present invention, the amount of acetone formed by the undesired cleavage is considerably reduced whereas the formation of aldehyde disappears almost completely; less than 0.5% of aldehyde is formed, calculated on the ester used.

Suitable esters of α-hydroxy-isobutyric acid are those of the alkyl series, such as the methyl, ethyl, propyl, butyl and isobutyl esters, the methyl ester being particularly preferred.

As phosphates contained in the heating bath, there may preferably be used primary, secondary or tertiary alkali metal phosphates such as sodium, potassium or ammonium salts, or the corresponding alkaline earth metal phosphates, for example, calcium phosphate.

The first stage of the process of the invention is carried out at a temperature above about +170° C. and below the boiling point of the heating bath.

Considerable amounts of the dehydration product are already formed when operating at a bath temperature above about +170° C. The maximum temperature is limited by the heat carrier forming the heating bath. It is of advantage to maintain the heating bath during the reaction at a temperature ranging between about +200° C. and about +300° C. but it is also possible to work at a higher temperature.

The dehydration can be carried out under normal pressure but it may be advantageous to operate in the first stage under reduced pressure in order to separate the reaction products more rapidly from the heating bath. When operating under reduced pressure, a smaller yield is obtained with a single throughput due to the shorter time of stay of the ester to be reacted in the contact bath but the total yield of the desired final product is increased if the recovered unreacted starting materials are recycled since all undesired side reactions are largely avoided due to the short time of stay, the total yield being calculated on the amount of the continuously recycled starting material which is replaced as it is consumed.

The ester used as starting material may be diluted with an inert solvent, such as an alcohol, a ketone or an aromatic hydrocarbon. Suitable solvents are, for example, methanol, ethanol, acetone, benzene, toluene and xylene. There may also be used other inert substances, particularly of the aforesaid classes of compounds, having a boiling point below about 160–180° C. The ester is diluted with the solvent in a ratio of about 2:1 to about 1:6 and preferably of about 1:1 to about 1:3.

The heating bath may be kept in motion by the simultaneous introduction of an inert gas. This step also serves to remove the reaction products more rapidly from the heating bath. As inert gases there may be used nitrogen, hydrogen, carbon monoxide and/or carbon dioxide.

The heating bath used in the process of the present invention consists, for example, of phosphoric acid buffered with phosphates such as secondary sodium phosphate. The buffer salts may be added to the phosphoric acid in an amount of at most about 20% by weight, calculated on the total amount of phosphoric acid plus buffer salts. As heating bath there may also be used an acidic salt melt such as a melt composed entirely of salts of phosphoric acid.

Furthermore, there may advantageously be used as heating baths in the process of the invention, higher fatty acids and paraffinic or aromatic hydrocarbons, for example oleic acid or elaidic acid admixed with catalytic amounts of phosphoric acid and/or phosphates. There may also be used paraffin mixtures or cylinder oils with a boiling point of above about +300° C. which also contain catalytic amounts of phosphoric acid and/or phosphates. The paraffin mixture or cylinder oil used has, in general, a boiling point in the range between about +380° C. and about +400° C. The catalytic amounts of phosphoric acid and/or phosphates added, for example secondary sodium phosphate, preferably vary between about 1 and about 5% of the bath substance. However, it is possible to add larger amounts of catalyst. Instead of paraffin mixtures or cylinder oils there may also be used as heating bath, aromatic hydrocarbons or mixtures thereof having a correspondingly high boiling point after the addition of catalytic amounts of phosphoric acid and/or phosphates.

The fine distribution of the pure or diluted starting material can be brought about by means of nozzles installed in the heating and contact bath. The simultaneously introduced inert gas can also be uniformly distributed by means of nozzles and thus keep in motion the bath to a smaller or larger extent. It is likewise possible to agitate the bath by means of a stirring device.

The catalytic amounts of acid added to the heating bath, particularly phosphoric acid, may be buffered, as stated above, by the addition of corresponding salts of said acid, for example secondary sodium phosphate.

The following examples illustrate the invention but they are not intended to limit it thereto; the parts being by weight unless otherwise stated.

*Example 1*

100 parts of liquid α-hydroxy-isobutyric acid ester (I) are introduced at a bath temperature of about 200° C. into a phosphoric acid bath containing 20% by weight of secondary sodium phosphate and finely distributed by means of a nozzle while nitrogen is simultaneously introduced. The reaction products continuously formed as (I) is introduced, i.e. methacrylic acid ester (II), acetone and water, distilled off immediately together with unreacted (I) and are separated from the nitrogen current and a small amount of CO formed by subsequent condensation. The condensation product is then subjected to fractional distillation in a known manner. Recovered amount of (I) can be directly recycled. From 100 parts of (I) used there are obtained 38.0 parts of (II) and 23.0 parts of acetone while 28.2 parts of (I) are recovered.

*Example 2*

100 parts of (I) are introduced in the liquid state and at a bath temperature of 260–270° C. into a paraffin bath containing 4% by weight of phosphoric acid and finely distributed by means of a nozzle while nitrogen is simultaneously added. The paraffin bath is kept in motion by the vivid nitrogen current. (II), acetone, water and unreacted (I) distill off directly from the bath and are separated by condensation from the nitrogen current and CO formed. The collected condensation product is then subjected to fractional distillation in a known manner. The recovered (I) can be immediately recycled. From 100 parts of (I) there are obtained 40 parts of (II) and 26 parts of acetone while 33.7 parts of (I) are recovered.

*Example 3*

100 parts of (I) diluted with benzene in a ratio of 1:1 are introduced at a bath temperature of about 260° C. into a paraffin bath containing 2% by weight of phosphoric acid. From 100 parts of (I) there are obtained 48.3 parts of (II) and 20.5 parts of acetone while 27.2 parts of (I) are recovered.

*Example 4*

100 parts of (I) diluted with toluene in a ratio of 1:1 are introduced at a bath temperature of about 270° C. into a paraffin bath containing 1% by weight of phosphoric acid. From 100 parts of (I) there are obtained 56.5 parts of (II) and 18.3 parts of acetone while 30.6 parts of (I) are recovered.

*Example 5*

100 parts of (I) diluted with acetone in a ratio of 1:1 are introduced at a bath temperature of about 240° C. into a cylinder oil bath containing 1% by weight of phosphoric acid. The cylinder oil is kept in motion by a moderate nitrogen current. From 100 parts of (I) there are obtained 42 parts of (II) while 36 parts of (I) are recovered.

*Example 6*

100 parts of (I) diluted with toluene in a ratio of 1:1 are introduced at a bath temperature of about 240° C. into a cylinder oil bath containing 1% by weight of phosphoric acid. The cylinder oil is kept in motion by a moderate current of carbon monoxide. From 100 parts of (I) there are obtained 37.1 parts of (II) and 12 parts of acetone while 44.7 parts of (I) are recovered.

*Example 7*

100 parts of (I) diluted with toluene in a ratio of 1:2 are introduced at a bath temperature of about 220° C. into a cylinder oil bath containing 2.5% by weight of phosphoric acid. The cylinder oil is kept in motion by a moderate current of carbon dioxide. From 100 parts of (I) there are obtained 33.15 parts of (II) and 6.8 parts of acetone while 54.3 parts of (I) are recovered.

*Example 8*

100 parts of (I) diluted with toluene in a ratio of 1:3 are introduced at a bath temperature of about 230° C. into a cylinder oil bath containing 2.5% by weight of phosphoric acid. The cylinder oil is kept in motion by a very weak hydrogen current. From 100 parts of (I) there are obtained 33.6 parts of (II) and 12.5 parts of acetone while 53.5 parts of (I) are recovered.

*Example 9*

100 parts of (I) diluted with methanol in a ratio of 1:1 are introduced at a bath temperature of about 290° C. into a cylinder oil bath containing 2% by weight of phosphoric acid.

A fine distribution takes place by means of hydrogen introduced through a nozzle. (II) water, acetone, unreacted (I) and the solvent distill off directly from the bath and are separated from the inert gas current by condensation. The condensate is then subjected to fractional distillation in a known manner. The recovered starting product (I) can be immediately reused in the cycle. From 100 parts of (I) there are obtained in a single throughput 45.9 parts of (II) and 1.6 parts of acetone while 45 parts of (I) are recovered.

*Example 10*

100 parts of (I) diluted with ethanol in a ratio of 1:1 are introduced at a bath temperature of about 300° C. into a cylinder oil bath containing 3% by weight of phosphoric acid. The added substances are finely distributed in the bath by means of a carbon dioxide current. (II), water, acetone, unreacted (I) and the solvent distill off from the bath and are worked up as described in the preceding examples. From 100 parts of (I) there are obtained 55 parts of (II) and 4.8 parts of acetone while 33.5 parts of (I) are recovered.

*Example 11*

100 parts of (I) diluted with toluene in a ratio of 1:1 are introduced at a pressure of about 100 mm./Hg and at a bath temperature of about 290° C. into a cylinder oil bath containing 1.6% by weight of phosphoric acid. The mixture is finely distributed in the bath by means of a stirring device. The amounts of (II), acetone, and water formed and the unreacted (I) distill off directly and are condensed. The combined condensation products are then subjected in known manner to a fractional distillation. When operating in this manner there are obtained in a single throughput from 100 parts of (I) used, about 10 parts of (II) and 2.2 parts of acetone. 86.0 parts of (I) are recovered and can be reused immediately in the cycle. Thus, an especially good yield (96%) of (II) is obtained calculated on the total amount of (I) used.

*Example 12*

100 parts of (I) diluted with xylene in a ratio of 1:1 are introduced at a bath temperature of about 300° C. into a cylinder oil bath containing 1.6% by weight of phosphoric acid and 3% by weight of secondary sodium phosphate. The cylinder oil is kept in motion by a moderate nitrogen current. From 100 parts of (I) used there are obtained 23.9 parts of (II) and 7.3 parts of acetone while 67.0 parts of (I) are recovered.

*Example 13*

100 parts of (I) diluted with toluene in a ratio of 1:1 are introduced at a bath temperature of 270° into an elaidic acid bath containing 3% by weight of phosphoric acid and finely distributed in the oil bath by means of a nitrogen current. (II), water, acetone and unreacted (I), as well as the solvent, distill off and are worked up. From 100 parts of (I) there are obtained 45 parts of (II) and 1.8 parts of acetone while 36.2 parts of (I) are recovered.

We claim:
1. A process for dehydrating esters of alpha-hydroxyisobutyric acid of the general formula

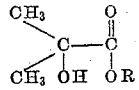

wherein R is a lower alkyl radical with one to four carbon atoms, which comprises introducing a corresponding ester of the alpha-hydroxyisobutyric acid in a first stage in the liquid to vaporous state into a liquid heating bath, composed of at least one substance selected from the group consisting of higher fatty acids, paraffin mixtures and cylinder oils, having a boiling point of above about 300° C., the liquid heating bath containing catalytic amounts of at least one substance selected from the group consisting of phosphoric acids, alkali metal phosphates, alkaline earth metal phosphates and mixtures thereof, maintaining the heating bath at a temperature in the range from about 170° C. and the boiling point of the heating bath, continuously agitating said bath, condensing in a second stage the reaction products formed which distill off immediately from the heating bath, and fractionating the reaction products.

2. A process as claimed in claim 1, wherein the unreacted alkyl-alpha-hydroxyisobutyrate acid ester obtained in the second stage is recycled into the first stage.

3. A process as claimed in claim 1, wherein the heating bath is maintained at a temperature in the range of from about +200° to about +300° C.

4. A process as claimed in claim 1, wherein the first stage is carried out under reduced pressure.

5. A process as claimed in claim 1, wherein the alkyl-alpha-hydroxyisobutyrate acid ester is used in dilution with at least one inert solvent selected from the group consisting of alcohols, ketones and aromatic hydrocarbons.

6. A process as claimed in claim 5, wherein the alkyl-alpha-hydroxyisobutyrate acid ester is used in dilution with at least one inert solvent selected from the group consisting of methanol, ethanol, acetone, benzene, toluene and xylene.

7. A process as claimed in claim 1, wherein the heating bath is kept in motion by the simultaneous introduction of at least one inert gas selected from the group consisting of nitrogen, hydrogen, carbon monoxide and carbon dioxide.

8. A process as claimed in claim 1, wherein elaidic acid is used as heating bath.

9. A process as claimed in claim 1, wherein secondary sodium phosphate is used as catalytic substance.

10. A process as claimed in claim 1, wherein the catalytic amount of the added substance selected from the group consisting of phosphoric acid and phosphate salts and mixtures thereof ranges from about 1 to 5% by weight of the bath substance.

References Cited in the file of this patent
UNITED STATES PATENTS 2,100,993    Bruson    Nov. 30, 1937
2,174,830    McAllister et al.    Oct. 3, 1939
2,244,389    D'Alelio    June 3, 1941

OTHER REFERENCES

Blatt: "Organic Syntheses," Collective Volume II, 1943, pp. 152–153.